July 10, 1962 H. W. ABBOTT ETAL 3,043,516
TIME SUMMING DEVICE FOR DIVISION, MULTIPLICATION, ROOT TAKING AND INTERPOLATION
Filed Oct. 1, 1959 4 Sheets-Sheet 1

INVENTORS:
HAROLD W. ABBOTT,
VERNON P. MATHIS,
BY Richard V. Lang
THEIR ATTORNEY.

INVENTORS:
HAROLD W. ABBOTT,
VERNON P. MATHIS,
BY Richard V. Lang
THEIR ATTORNEY.

INVENTORS:
HAROLD W. ABBOTT,
VERNON P. MATHIS,
BY Richard V. Lang
THEIR ATTORNEY.

INVENTORS:
HAROLD W. ABBOTT,
VERNON P. MATHIS,
BY Richard V. Lang
THEIR ATTORNEY.

3,043,516
Patented July 10, 1962

3,043,516

TIME SUMMING DEVICE FOR DIVISION, MULTIPLICATION, ROOT TAKING AND INTERPOLATION

Harold W. Abbott, Cohoes, and Vernon P. Mathis, Baldwinsville, N.Y., assignors to General Electric Company, a corporation of New York Filed Oct. 1, 1959, Ser. No. 843,716
16 Claims. (Cl. 235—195)

The present invention relates to computational devices for performing simple arithmetic calculations and in particular to computational devices employing electrical components in performing computation with respect to electrical quantities.

The present invention treats a number of electronic circuits which can perform division $(A/B)$ of two electrical input quantities A and B, multiplication $(AB)$, interpolation $A/(A+B)$ and the taking of roots. The invention is applicable to performing the computations both with respect to electrical quantities in the form of voltage magnitudes as well as with respect to electrical quantities wherein the magnitudes are defined by their frequencies or by a predetermined number of pulses. The output may be derived in the form of voltage magnitudes or in the form of a number of pulses, usually counted. The invention is applicable to the conversion of analogue quantities to digital as well as to the converse conversion of digital quantities into analogue quantities, these conversions being accomplished either with or without the performance of an arithmetic operation.

Accordingly, it is an object of the present invention to devise a novel arithmetic computer suitable for performing a number of simple arithmetic computations.

It is another object of the present invention to provide a simple arithmetic computer capable of converting an analogue input quantity to a digital output quantity.

It is a further object of the present invention to provide a simple arithmetic computer whose accuracy is largely independent of the operation of dynamic elements, but is primarily dependent upon the parameters of passive elements.

It is a further object of the present invention to provide a family of arithmetic computational devices of an electrical nature capable of performing division, multiplication, interpolations, the taking of roots and the like having a maximum of simplicity.

These and other objects of the invention are achieved by the use of a pair of time summation devices arranged to perform summing operations during equal time intervals upon applied electrical quantities. An electrical quantity is fed to one of these summing devices. After time summation it is compared in a comparison device to another electrical quantity, the comparison device being arranged to halt the time summation function of a third electrical quantity in the other time summation device at the moment that the compared summed quantity and the other quantity reach equality.

When the first and second mentioned electrical quantities represent input quantities and the third a reference quantity, an output is derived proportional to the quotient of the input quantities. When the second and third mentioned electrical quantities represent input quantities and the first a reference quantity, an ouput is derived proportional to the product of the input quantities. If one combines in a preliminary adding circuit the first and second input quantities, performs the time summation of the combination and then proceeds to compare the integrated quantity with one input quantity, this summation occurring simultaneously with the time summation of a reference quantity, then one can obtain an output quantity proportional to the ratio of one input quantity to the sum of the two input quantities.

If one wishes to obtain a root, one may derive the first electrical quantity from the output of the second time summing device and applying the same to the input of the first time summing device. Depending upon the time summing properties of the latter summing device, one may derive square, cube and higher order roots.

The information may be applied in digital or analogue form and derived in digital or analogue form, this flexibility being achieved by a proper selection of the time summing device and the form of the inputs supplied thereto. Thus, if one employs input voltage magnitudes, one may employ an integrator whereas if one employs digital pulse quantities, one may use a counter to perform the time summation.

The features of the invention which are believed to be novel are set forth with particularity in the appended claims. The invention itself, however, both as to its organization and method of operation, together with further objects and advantages thereof may best be understood by reference to the following description when taken in connection with the drawings, wherein:

Figure 12:
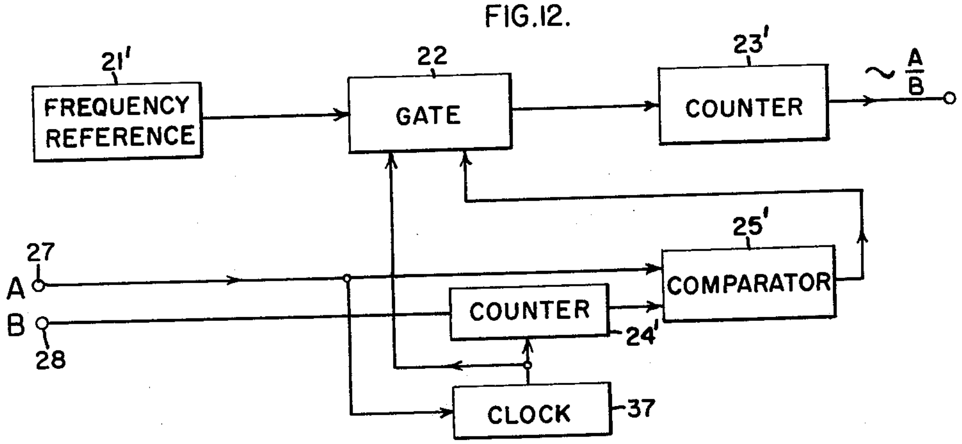
Figure 13:
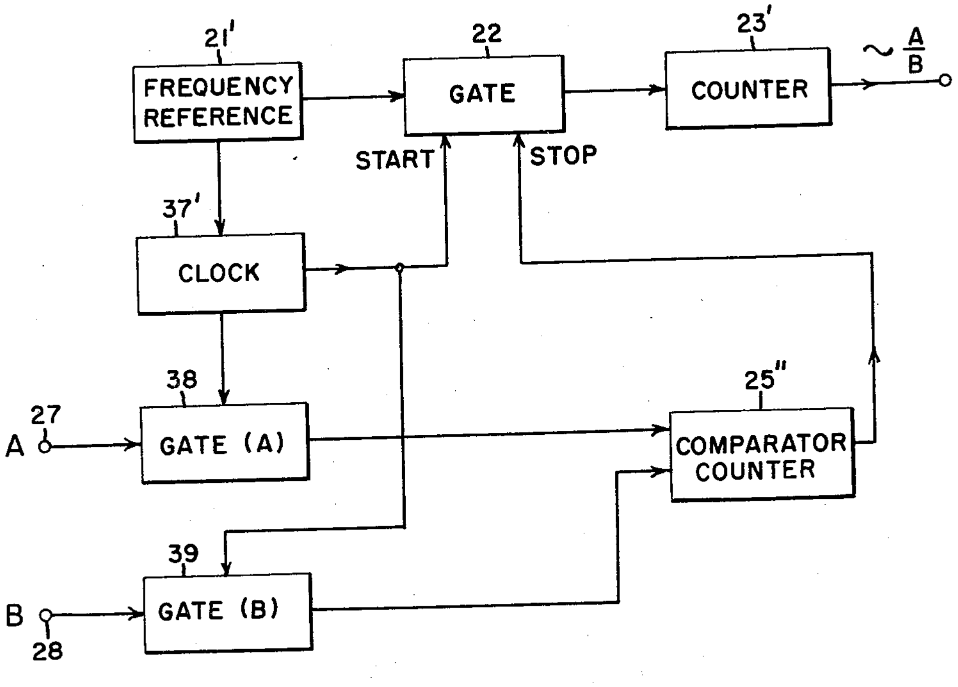

FIGURE 12 is another embodiment of the invention adapted to provide an output indicative of the ratio between two input electrical quantities in the form of a number of pulses wherein one electrical input quantity is in the form of a frequency and the other input quantity is in the form of a predetermined binary coded number, the output being in the form of a number of pulses recorded in a suitable pulse counter; and FIGURE 13 is another embodiment of the invention wherein an output quantity proportional to the ratio of two input quantities coded in frequency is derived in the form of an indicated number of output pulses.

Figure 1:
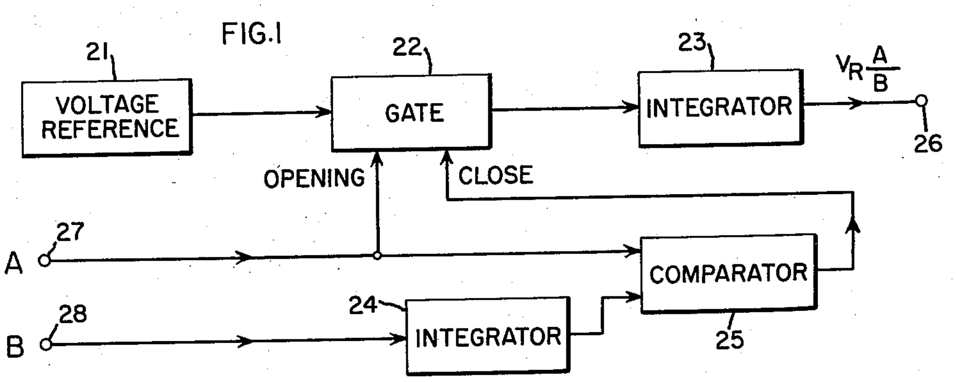
FIGURE 1 is a block diagram illustrating the organization of a first embodiment of the invention adapted to provide an output proportional to the ratio of two applied input quantities.

Referring now to FIGURE 1 there is shown in block diagram form a first embodiment of the invention adapted to determine the ratio of two input electrical quantities applied simultaneously. In the embodiment under consideration, the input electrical quantities are in the form of magnitudes of applied voltages and the output also takes the form of a voltage magnitude. The first embodiment has as its principal parts a source of reference voltage 21, a gate 22 having opening and closing control terminals and an input and output signal path, an integrator 23 adapted to perform a time integration of an applied voltage, a second integrator 24, also adapted to provide a time integration of an applied voltage, and a comparator 25 having two inputs and adapted to provide at its output an indication when the two applied input voltages are brought into magnitude coincidence.

The above parts 21 through 25, performing the function of determining the ratio between two input electrical voltages, are connected together in the following manner. The source 21 of reference voltage is coupled to the input of the integrator 23 through the gate 22. By this connection, the voltage reference source is arranged to supply a constant voltage to the integrator throughout the time that the gate 22 is open. The integrated voltage developed at the output of the integrator 23 is coupled to the output terminal 26 of the computer. The opening of the gate 22 is controlled by one input voltage and the closing by the action of the integrator 24 and comparator 25. The input terminal 27, to which one input signal (A) is coupled, is connected both to the turn on control terminal of the gate 22 and to one input terminal of the voltage comparator 25. The other input terminal 28, to which the other input quantity B is coupled, is connected to the input terminal of the integrator 24. The integrated output from integrator 24 is fed to the other input terminal of the comparator 25. The comparator 25 produces an output at the moment of coincidence between the A input quantity applied to the input terminal 27 and the integrated B input quantity applied to the input terminal 28. The comparator output is fed to the turn off terminal of the gate 22 and closes the gate.

Accordingly, it may be seen that the gate 22 is turned on upon the occurrence of a voltage at the input terminal 27, this being simultaneous with the application of voltage to terminal 28 and the commencement of integration in integrator 24. The gate 22 is turned off upon the occurrence of coincidence between the magnitude of the voltage applied to the terminal 27 and the time integration of the voltage applied to the input terminal 28.

The foregoing operation produces an output voltage quantity equal to $$V_R\frac{A}{B}$$

This may be readily demonstrated. The quantity B applied to the integrator 24 is integrated for the amount of time required to bring it into magnitude coincidence with the quantity A. This amount of time may be defined $T_1$:

$$\int_0^{T_1} B.dt = A \qquad (1)$$

$$T_1 = \frac{A}{B}$$

$T_1$ is in turn the total amount of time that the gate 22 is allowed to remain open permitting the quantity $V_R$ to be integrated in the integrator 23. The output voltage V is the integral of $V_R$ for the time $T_1$:

$$V = \int_0^{T_1} V_R dt = V_R T_1 \qquad (2)$$

But $$T_1 = \frac{V}{V_R} \text{ and } T_1 = \frac{A}{B}$$

Accordingly $$V = V_R\frac{A}{B} \qquad (3)$$

The output voltage is equal to the ratio of the input electrical voltages A and B times the reference quantity $V_R$.

At this point it should be observed that the input quantities A and B are assumed to be constant during the periods of integration, and the reading is assumed to be taken at approximately the time that the integration is completed in the integrator 23. This last requirement is dependent upon the leakage rate of the integrating network, and so in many practical cases may be several micro-seconds or several minutes, depending upon the desired accuracy and input magnitudes. If the integration departs from the ideal as is true in most practical realizations of integration, accuracy of computation is still preserved provided that both integrators 23 and 24 obey the same law. As an example, resistance-capacitance integrating networks are eminently satisfactory, providing equal time constants are selected for the integrating networks.

Figure 2:
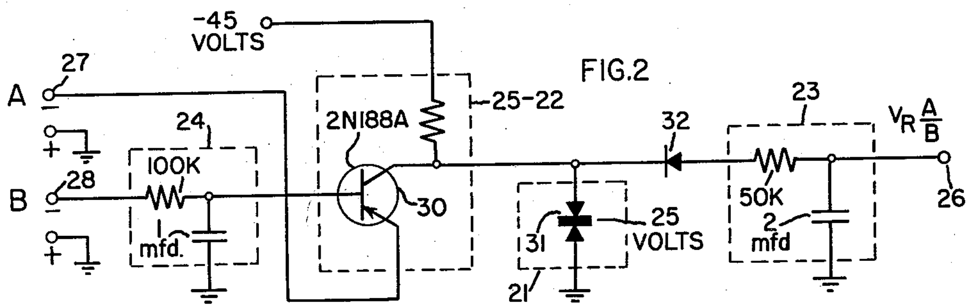
FIGURE 2 is a schematic diagram of the circuit corresponding to the embodiment illustrated in FIGURE 1.

The foregoing embodiment for computing the ratio of two input electrical voltages, so far described in block diagram form, is readily and simply realized. FIGURE 2 shows the schematic wiring diagram, including suitable but purely exemplary component parameters. The schematic wiring diagram also contains dotted blocks surrounding the various components to symbolize the functions these components perform in the overall computation network. The input terminal 27, to which the input voltage A is connected, is fed to the emitter of a transistor 30. The input signal B, coupled to the input terminal 28 is fed through the integrator 24 which comprises an R-C network including a single resistance and a single capacitor to the base electrode of the transistor 30.

The transistor 30 serves both as the comparator 25 and as the gate 22. The collector of the transistor 30 is connected through a load resistance to a D.C. source of minus 45 volts. In standby operation, the transistor is biased to be normally conducting with the collector assuming a potential near zero, with a zero voltage applied at the input terminal 27(A) and a slightly negative potential applied at input terminal 28(B). When a substantial negative voltage is applied to the base, as by application of the A input voltage, the transistor is cut off. When the transistor 30 enters cut off condition, the collector voltage rises from near zero potential to a reference potential established by breakdown diode 31, and commences charging the integration network 23, comprising a single resistance and a capacitance, through the diode 32. At the moment when the input voltage A is approximately equal to the integrated input voltage B, the base-to-emitter diode is forward biased and the transistor 30 conducts, thus allowing the collector voltage to again return to near ground potential and terminating the charging action through the diode 32. Thus it may be seen that the transistor 30 serves both as the comparator and as the gate for disconnecting the reference voltage from charging the integration network. The diode 32 serves the principal purpose of isolating the output integration network and preventing discharge of the stored voltage when the transistor is returned to a conductive state. It may be dispensed with in the event that a reading is taken at maximum stored voltage. It may be noted that the time constants of the two integrating networks are made equal.

Figure 3:
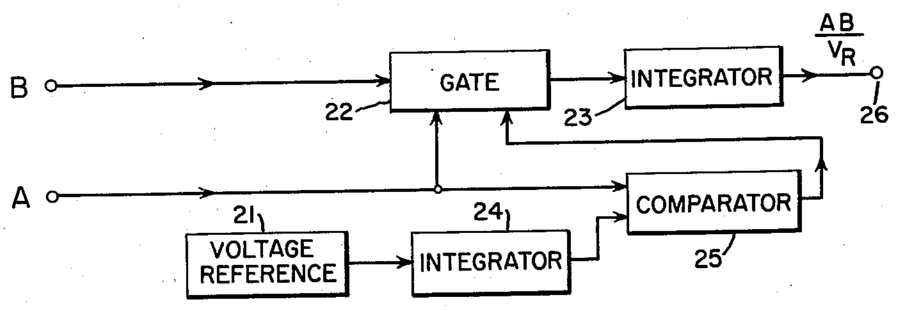
FIGURE 3 is a block diagram of a second embodiment of the invention providing an output proportional to the product of two input quantities.

A second embodiment of the invention adapted to provide an output which is proportional to the product of two input quantities is shown in FIGURE 3. It will be seen that the second embodiment consists of the same principal parts illustrated in the first embodiment in FIGURE 1. Except for the exchange between the connections for the input quantity B with the connections for the reference voltage, the two are alike. It should be intuitively clear that the output voltage B will now be equal to the product of the quantities A and B divided by the reference voltage ($V_R$).

In execution, the blocks illustrated in FIGURES 1 and 3 may be substantially alike. If one employs a circuit configuration similar to that illustrated in FIGURE 2 one must insure suitable operating conditions for the transistor 30, such that it will be turned off when a zero A input voltage is applied at terminal 27 and a suitable reference source is applied at terminal 28. The other input voltage B is applied to the collector circuit of transistor 30 at the point of connection of the 45 volt supply voltage. The resistance of the collector load resistance then becomes a part of the time constant of the integrator 23. The reference diode is of course removed from the collector circuit.

Figure 4:
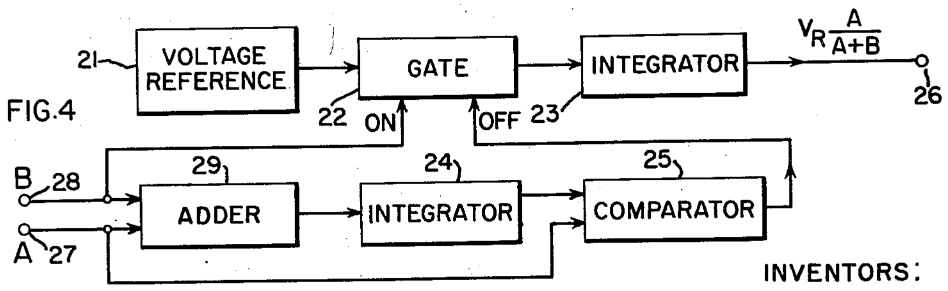
FIGURE 4 is a block diagram of a further embodiment of the invention adapted to provide an output which is an interpolation quantity, proportional to the ratio of one of two input quantities to the sum of the two input quantities.
Figure 5:
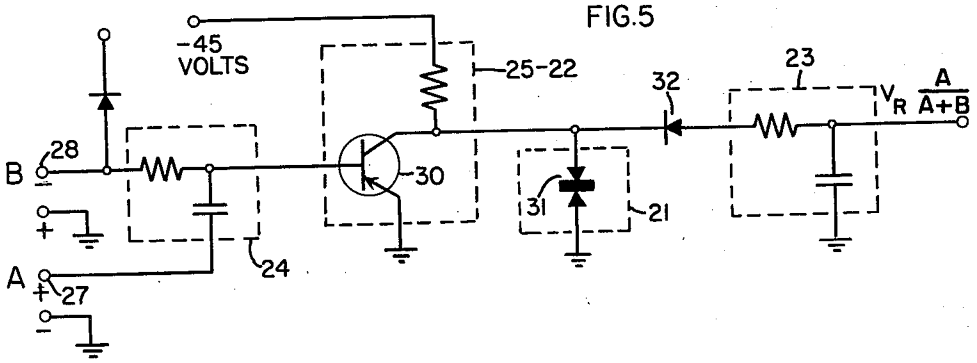
FIGURE 5 is a schematic diagram of the embodiment illustrated in FIGURE 4.

An embodiment of the invention which provides an interpolation quantity defined as $$V_R\left(\frac{A}{A+B}\right)$$

is shown in block diagram in FIGURE 4 and in circuit diagram in FIGURE 5 with exemplary component parameters included. The interpolation computer has a block diagram very similar to that of the first embodiment in that the voltage reference source 21, gate 22, integrator 23, integrator 24 and comparator 25, are again employed and coupled in essentially the same manner to one another. The interpolation computer, however, has an additional element denominated the adder 29. The input quantity A is fed to the turn on terminal of the gate 22, to one input terminal of the adder 29 and to one input terminal of the comparator 25. The input quantity B is coupled to the other input terminal of the adder 29. The adder 29 thus sums the input quantities A and B and feeds the sum to the integrator 24. The integrated input quantity $(A+B)$ is then applied to the comparator 25 and compared simultaneously with the input quantity A. From this point on, the interpolation computer is essentially the same as the rationing computer illustrated in FIGURE 1.

The schematic wiring diagram of the interpolation computer illustrated in FIGURE 5 is also similar in execution to that illustrated with respect to the first embodiment. The input connections are modified to provide for the addition of the input electrical quantities A and B prior to their integration and application to the transistor 30 acting as the comparator and gate. The addition is provided by the serial connection of the A input voltage to the ground point of the integrating network 24 while the B input voltage is connected in opposite polarity to the input terminal of the integrating network. The negative voltage connection of input terminal 28 through diode 33 is provided to insure that the transistor is in normal standby operation (i.e. conducting) until the quantity A is applied to the terminal 27.

Figure 6:
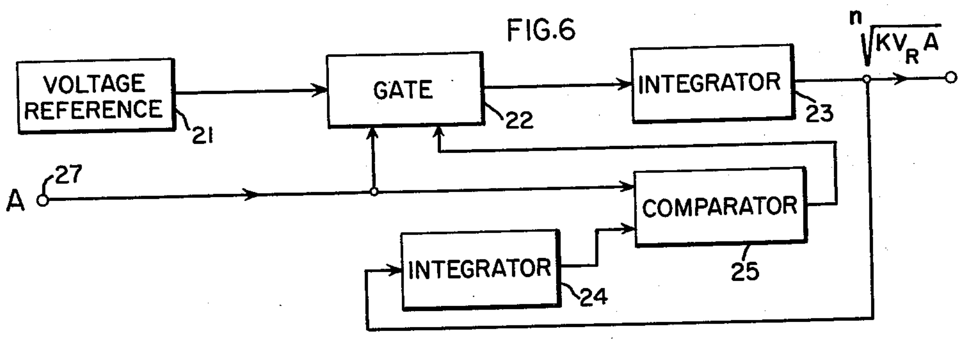
FIGURE 6 is a block diagram showing an embodiment of the invention capable of taking a root of an input electrical quantity.
Figure 7:
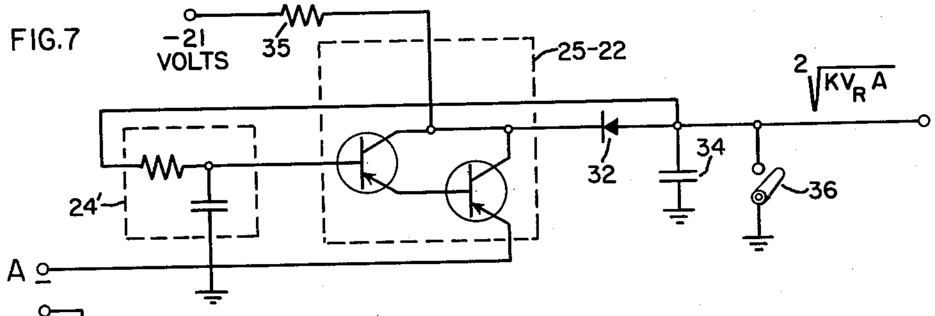
FIGURE 7 is a schematic diagram of one form of the arrangement shown in FIGURE 6 adapted to obtain the square root of an input quantity.
Figure 8:
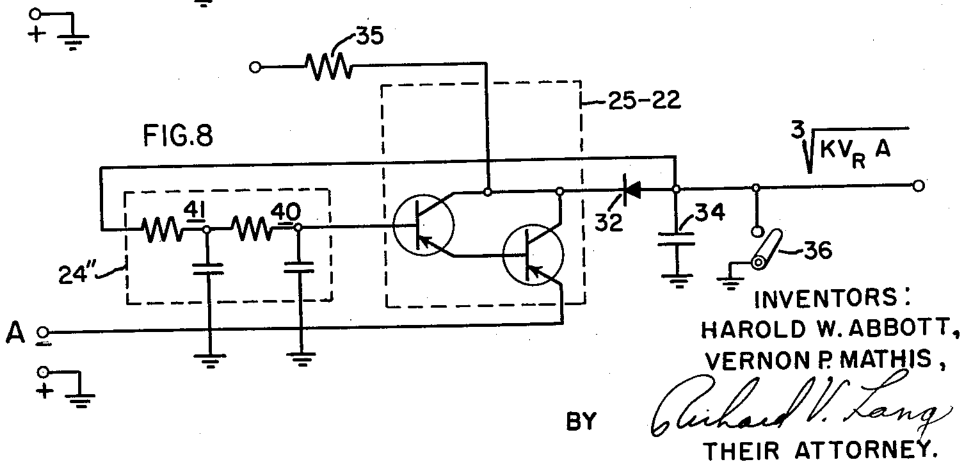
FIGURE 8 is a schematic diagram of another form of the embodiment illustrated in FIGURE 6 wherein the cube root of an input electrical quantity is obtained.

A root taking arithmetic computer is illustrated in block diagram form in FIGURE 6 with a modified version adapted to taking a square root being illustrated in schematic diagram in FIGURE 7 and another modified version adapted to taking the cube root being illustrated in schematic form in FIGURE 8. The root taking computer illustrated in FIGURE 6 comprises the source of reference voltage 21, the gate 22, the integrator 23, the integrator 24 and the comparator 25. Each of these blocks are generally similar in nature to the blocks illustrated with respect to the arrangement of FIGURE 1. The mode of interconnection of the blocks however is slightly modified since only a single computer input is provided and the input to integrator 24 is supplied from the output of the integrator 23. In addition, for reasons which will shortly be explained, the time constants of the integrators must satisfy additional criteria.

The operation of the circuit in the process of taking a root may be explained as follows. At the moment that the gate 22 is opened to permit the reference voltage to be fed to the integrator 23, the integrator begins to integrate the applied voltage. At a selected time ($T_1$) subsequent to the initiation of integration, the output quantity V stored in the integrator 23 is the time integral at the time selected of the quantity $V_R$:

$$V=\int_0^{T_1} V_R dt=V_R T_1 \tag{4}$$

If the integration is performed for an arbitrary time ($t$) we may express the quantity V as equal to the product of $V_R$ and $t$:

$$V=V_R t \tag{5}$$

The output of the integrator 23 (containing this time dependent quantity) is then fed to the input of the integrator 24. The output of integrator 24 being the time integration of a time dependent quantity now becomes dependent upon the square of the time. Assuming time integration for the time $T_1$ the output ($V_{24}$) of the integrator 24 is:

$$V_{24}=\int_0^{T_1} V_R t dt=\frac{V_R T_1^2}{2} \tag{6}$$

In the comparator 25, the quantity (3) is compared with the input quantity A to determine when to shut off the gate 22. Accordingly, we may equate the input A quantity to the output ($V_{24}$) of integrator 24:

$$A=\frac{V_R T_1^2}{2} \tag{7}$$

Solving for V, the output quantity, using expressions 4 and 7 and eliminating the quantity $T_1$, we find that V is proportional to the square root of the input quantity A or more precisely;

$$V=\sqrt{2V_R A} \tag{8}$$

If the time constant of the integrator 23 is made twice the time constant of the integrator 24 no inaccuracies will result in taking square root attributable to R–C type integration.

A schematic circuit for performing the operation of taking a square root is illustrated in FIGURE 7. It may be seen to include a single section resistance and capacitance network for the integrator 24. The comparator and gate is provided by a Darlington connection of two transistors, this connection being employed to increase the input impedance of the over all comparator. A single transistor of high alpha may also be employed. The integrator 23 is composed of the output capacitor 34 and the resistance 35 coupled from the collectors of the two transistors to a source of bias potentials. In the circuit illustrated in FIGURE 7 initiation of the integration is commenced by opening a switch 36 shunting the integrating capacitor 34 instead of by the application of input potentials at the input terminals 27. Either mode of initiation may be employed.

The arrangement illustrated in FIGURE 8 is of similar operation and configuration to that illustrated in FIGURE 7 but differs therefrom in the provision of a second section in the integration network 24. If the second section 41 is arranged to have twice the time constant of the first section 40, and the time constant of the integrating network 23, comprising elements 34 and 35, three times the time constant of the first section 40, then R-C type integration will introduce no errors in the cube root computation. Similar considerations apply to the taking of higher order roots.

The foregoing arithmetic computers so far described have operated upon input quantities in the form of voltage magnitudes to produce output quantities in the form of voltage magnitudes. The invention is equally operable with input quantities in the form of voltage magnitudes while producing an output quantity in the form of a number of output pulses or in a registered count of these output pulses.

Figure 9:
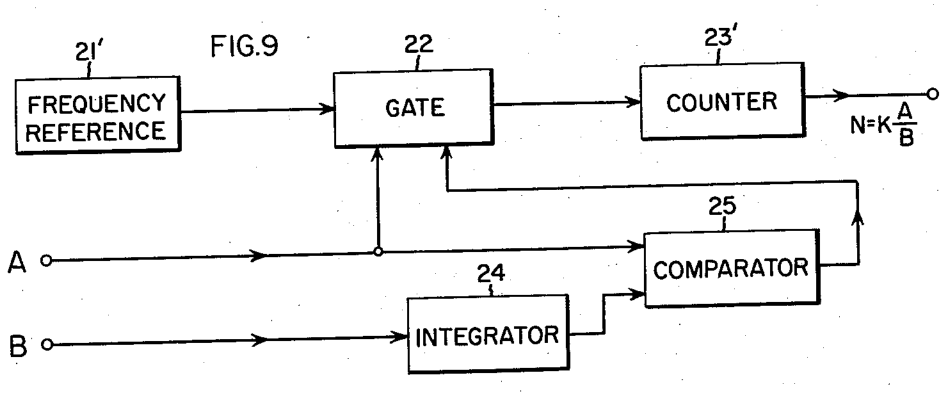
FIGURE 9 illustrates in block diagram form a further embodiment of the invention wherein the input electrical quantities are voltage magnitudes and wherein an output indicative of the ratio of these input magnitudes is obtained in the form of a number of output pulses usually recorded in a counter.

The arrangement illustrated in block diagram form in FIGURE 9 performs the function of producing a quantity proportional to the ratio between two input voltage magnitudes A and B. It may be observed that the blocks and interconnections of the blocks are similar to the corresponding features in the ratioing computer illustrated in FIGURE 1. The arrangement illustrated in FIGURE 9 differs, however, in that a frequency reference 21' is now substituted for the voltage reference source 21 of FIGURE 1 and a counter 23' is substituted for the integrator 23 of FIGURE 1. The elements 21', 22' and 23' perform the same essential functions of the corresponding elements 21, 22 and 23 of the arrangement illustrated in FIGURE 1. In particular, both elements 23 and 23' perform a time summation of the electrical input quantity from the sources 21 and 21' during the time that the gate 22 is open. Considering FIGURE 9, alone; upon opening of the gate 22, individual cycles from the frequency reference 21' are supplied to the counter 23', which counts each cycle that is supplied through the gate 22 until that gate is closed. Thus it may be seen that the count in the counter 23' is in fact a linear time integral or summation of the cycles delivered by the frequency reference source. In order that the computation be performed accurately in the arrangement of FIGURE 9, it is essential that the integrator 24 to which the input quantity B is applied also perform its integration in a manner similar to the time response of the frequency reference 21'. For example, if the reference frequency is constant, then the integrator should perform its integration linearly with respect to time. On the other hand, if an R-C integrating network is used, then the reference frequency is periodically adjusted to compensate for the departure from linearity of the R-C network.

Figure 10:
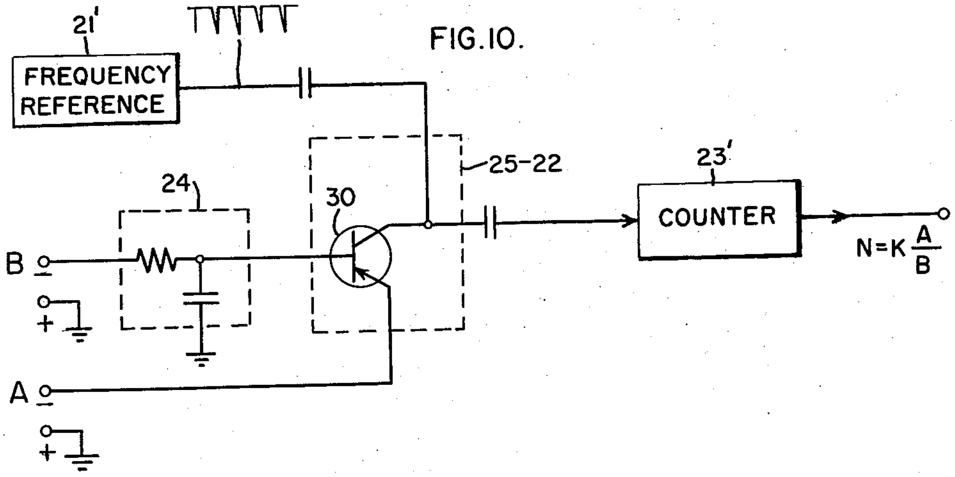
FIGURE 10 is a schematic illustration of the embodiment illustrated in FIGURE 9.

A practical circuit for achieving the foregoing ratio computation is illustrated in FIGURE 10. The transistor 30 provides the gating and comparing functions while a resistance-capacitance network 24 performs the input integration function. The collector of the transistor 30 is coupled to a source of reference frequency 21' and to a counter 23' of a type counting only those cycles or pulses exceeding a minimum amplitude. The circuit parameters are then selected so that when the transistor 30 is in a conductive low impedance state, that the output pulse at the counter input is of a magnitude less than that required to operate the counter. Conversely, when the transistor 30 becomes non-conductive, its impedance is sufficiently high so that the pulses available at the counter input terminal are sufficiently high to operate the counter.

Figure 11:
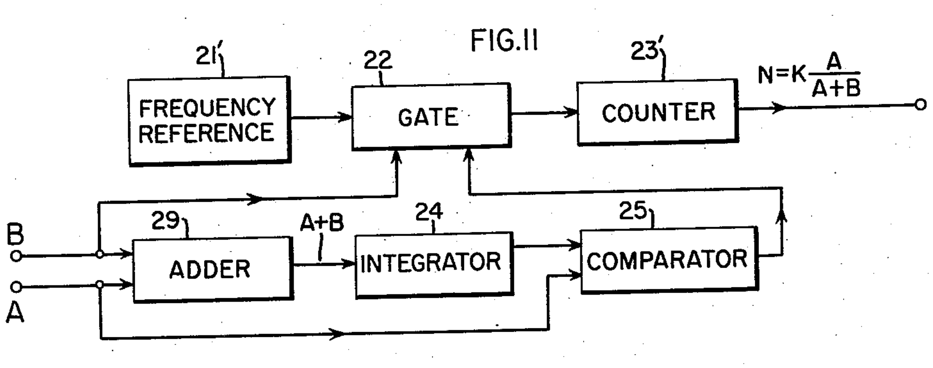
FIGURE 11 is a further embodiment of the invention wherein the input electrical quantities are voltage magnitudes and the output indication is in the form of a number of pulses recorded in a counter, this embodiment providing an indication of the ratio between one input quantity and the sum of that input quantity and a second input quantity.

In a manner similar to that used in the embodiment of FIGURES 9 and 10 one may obtain a pulse type output in the process of performing the interpolation function to obtain an output quantity proportional to $A/(A+B)$, the quantities $A+B$ representing voltage magnitudes. Such an arrangement is illustrated in FIGURE 11. The components 21', 22 and 23' may take the same form as indicated with respect to FIGURE 9. The over all organization and operation of the arrangement is essentially the same as that illustrated in FIGURE 4.

The foregoing FIGURES 9, 10 and 11 wherein the output is taken in the form of a number of output pulses or in a counted number of output pulses provide the function of converting analogue input quantities to digital output quantities. This feature is thus of considerable interest in many practical applications wherein the analogue to digital conversion is desired. (One may also achieve the converse function by the use of applicant's novel techniques as will be explained subsequently.)

The invention is also applicable to the problem of performing computations wherein the input quantities are in the form of numbers of pulses or in the form of a frequency whose value is indicative of a desired input value.

FIGURE 12 illustrates an arrangement wherein an output quantity is obtained proportional to the ratio between a digital number A and a periodic electrical quantity of frequency B. The output quantity in this embodiment is provided in digital form as a counted number of pulses.

The arrangement illustrated in FIGURE 12 includes a gate 22, a counter 23', a second counter 24', and a comparator 25'. It may be seen that each of these component blocks corresponds to like component blocks in FIGURES 1 and 9 and that each block is similarly interconnected except for connections of the turn on terminal of gate 22 and of counter 24' to a clock 37 now additionally provided. In FIGURE 12 the priming of the reference numerals to blocks 21', 23', 24' and 25' is intended to indicate modification of these blocks for pulse operation from input to output of the ratio computer. Thus the input integrator 24 and comparator 25 of FIGURE 1 have as a counterpart in FIGURE 12 a counter 24' and a comparator 25'. The counter 24' is adapted to provide a time summation of an input quantity as did the integrator 24. Its output quantity is thus equal to the number of cycles applied within the time of computation, which output quantity is fed to the comparator 25'. The comparator 25' may take the form of a multiple-stage coincidence gate of suitable capacity to accommodate the desired binary input quantities. Its function is to compare the binary number applied at the terminal 27 with the counts accumulated over the time of computation of the pulses of periodic nature applied at terminal 28 and to produce, when these two quantities are equal, an output signal to turn off the gate 22. The elements 21', 22 and 23' may be the same as those used in connection with the embodiment shown in FIGURE 9.

In operating the ratioing computer illustrated in FIGURE 12, one initially applies the binary input A to the comparator 25 at input terminal 27 and then supplies the periodic input of frequency B to the counter 24' at input terminal 28. The counter 24' then continues to feed pulses at input frequency B until the comparator 25' reaches zero and coincidence is reached closing gate 22 and terminating the calculation.

The gate 22 may be opened in several ways, it being essential that it be open a time interval equal to the time interval that the frequency counter 24' is feeding its output to the comparator 25', and that the time interval for gate 22 be initiated with a predetermined time relationship to the time that the binary number at input 27 has begun to be applied. This latter relationship is most readily achieved by use of a clock 37 started at the moment that the A input is applied and adapted to produce a turn on output for both gate 22 and counter 24' after a preselected time interval. If one uses a simultaneous parallel feed of input A to the comparator 25', the time delay in the clock can be quite small. If, however, one employs a series type feed or other supply methods requiring some time to apply, the clock delay must be such that the registered input of A must never be exceeded by the B frequency count, until the A quantity is fully registered. If this requirement is not met a false zero will be indicated and an improper answer produced. One may avoid the difficulty by lengthening the clock delay. The output connections of the clock 37 to the counter 24' and to the gate 22 thus initiate simultaneous starting of both counting devices 24' and 23' respectively.

An arrangement for determining an output quantity proportional to the ratio of two input quantities is illustrated in FIGURE 13. In FIGURE 13, the output quantity is derived in the form of a counted number of pulses and the both input quantities are in the form of periodic quantities of frequencies A and B. The ratioing computer of FIGURE 13 comprises a frequency reference 21′ coupled through the gate 22 to the counter 23′. The computer input terminal 27 of the ratioing computer is coupled to a first or A input gate 38 which has its output coupled to one input terminal of a comparator counter 25″. The other computer input terminal 28 is coupled to the input of the second or B input gate 39 whose output leads to the other or reversing input terminal of comparator counter 25″. The output terminal of the comparator counter 25″ is coupled to the stop terminal of the gate 22. Timing control of the input gates 38 and 39 is achieved by means of a clock 37′ whose output is fed to these gates, opening one and closing the other in timed synchronism with the frequency reference source 21′. The opening of the gate 22 is timed to occur with the opening of the B gate thus starting both the counter 23′ and the reversal of the comparator counter 25″ simultaneously.

The frequency reference source 21′, the gate 22, the counter 23′ are of the same content and are similarly connected as in the previous embodiment. The clock 37′ in this embodiment precisely controls the interval that impulses are supplied through the input gates 38 and 39 opening first gate A and then gate B. The A pulses are then applied to the comparator counter 25″, which registers the A pulses. The comparator counter also performs the functions analogous to those of both the counter 24′ and the comparator 25′ of FIGURE 12 with respect to the B pulses. The comparator counter 25″ may take the form of a reversible counter, serving both as a register for the A input quantity coupled to the forward counting input terminals and as a counter of the B pulses coupled to the backward counting input terminals.

In operation, the A quantity is supplied initially and the forward count of the A quantity for a fixed time interval is registered. Then the A gate is closed stopping supply of the A quantity and the B gate and gate 22 are opened allowing the quantity B to be supplied through the B gate to the backward counting input terminals and allowing the counter 23′ to commence counting. The reversible counter 25″ then counts backwards until zero is reached at which time an output pulse is produced closing the gate 22 and terminating the operation of counter 23′.

In the embodiment of FIGURE 13, the comparator counter 25″, to which the A counts are first applied, must be completely emptied during the time that the B counts are applied. If one wishes to satisfy this requirement wherein the quantity A is more than one but not in excess of 10 times the quantity B, one may adjust the clock so that the time intervals for supplying the A pulses is reduced to one tenth the time that B pulses are supplied.

From the above examples of the invention, it should be apparent that several variations of the examples illustrated in FIGURES 12 and 13 may be made along the lines of the embodiments following the first embodiment illustrated in FIGURE 1 and along the lines of those embodiments following the embodiment illustrated in FIGURE 9.

In each of the embodiments, substitutions of various known components may be made in the various blocks. The integrators, gates, comparators, and other blocks which have been illustrated in exemplary fashion by R-C networks, transistors, etc. may be replaced by standard components performing these functions. It should be recognized, however, that in the use of the illustrated components, great circuit simplicity has been achieved, it being possible for instance with respect to the transistor to perform both the comparing and gating function in a single simple device.

The basic timing relation between the two summing devices in each embodiment is that the one time summation done by the element 24, 24′, and composite element 25″ establish the time that the summation is taking place in the integrator-counters (23, 23′). In each of the illustrated embodiments the two summations are performed simultaneously, usually by a connection of the open control terminal of the gate 22 to the A or B input. When the two inputs A and B are applied simultaneously, one may use either the A or B inputs since the summing devices will both commence at the same time from either connection. In the event that the A and B quantities are not applied simultaneously, one would select the B input as the connection for starting both integrators. The embodiments illustrated in FIGURES 1 through 5 and 9 through 11 assumes simultaneously applied inputs in the form of voltage magnitudes. In these examples either the A or B inputs may be used to initiate the time summations. In FIGURE 12 the A input after a delay is used to start the counter 24′ and to open the gate 22 permitting the counter 23′ to start at the same time. In FIGURE 13, the gate 22 and B gate 39 are turned on together permitting simultaneous starting of the counters 23′ and 25″.

While one has not illustrated the use of voltage magnitude outputs with the frequency or digital type inputs, this may be done by replacing the frequency reference source 21′ and the counter 23′ of FIGURE 13 by the voltage reference 21 and the integrator 23. In such mixed examples, the accuracy of operation is limited only by the linearity of the integrator deriving the voltage magnitudes.

It should also be apparent that if one wishes one may make a direct analogue to digital or digital to analogue conversion without at the same time performing some other arithmetic operation, one may assign a value of one to one input quantities.

While specific embodiments of the invention have been shown and described, it should be recognized that the invention is not limited thereto, and therefore it is intended in the appended claims to claim all such variations as fall within the true scope of the invention.

What we claim as new and desire to secure by Letters Patent of the United States is:

1. In combination, a transistor having input electrodes and an output electrode, means for supplying a first electrical quantity to an input electrode poled to cause said transistor to tend to one condition of conductivity, means for performing a time summation of a second electrical quantity and for supplying said summed quantity to an input electrode in a polarity to cause said transistor to switch to the other condition of conductivity when said applied input quantities approximate equality, means for supplying a third electrical quantity, means coupling the output electrode of said transistor in circuit with said last recited supply means and a second time summing means for gating the transfer of said electrical quantity to said second time summing means in accordance with the condition of conductivity of said transistor.

2. The combination set forth in claim 1 wherein said first and second electrical quantities are supplied to separate input electrodes, said last recited electrical quantity is a constant voltage and said time summing means are resistance-capacitance integrating networks.

3. The combination set forth in claim 1 wherein said second electrical quantity is a constant voltage.

4. The combination set forth in claim 1 wherein said first time summing means is a resistance-capacitance integrating network having its output terminal coupled to one input electrode, its input terminal coupled to means for supplying said second electrical quantity and its common terminal coupled to said means for supplying said first electrical quantity in proper polarity to add said input electrical quantities prior to integration.

5. The combination set forth in claim 1 wherein each of said electrical quantities are voltage magnitudes, and wherein said second electrical quantity is the output derived from said second time summing means.

6. The combination set forth in claim 5 for deriving a square root wherein said first and second time summing means are resistance-capacitance integrating networks, the second time summing means having a time constant twice that of said first time summing means.

7. The combination set forth in claim 5 for deriving a cube root wherein said first, second and third electrical quantities are voltage magnitudes and wherein said first and second time summing means comprise resistance-capacitance integrating networks, said second time summing means having a time constant of three units and said first time summing means having a first and a second integrating section, the first section having a time constant of two such units and the second section having a time constant of one such unit.

8. The combination set forth in claim 1 wherein said third electrical quantity is a frequency and said second time summing means is a counter.

9. The combination set forth in claim 4 wherein said third electrical quantity is a frequency and said second time summing means is a counter.

10. A computation network comprising means for obtaining a first electrical quantity, a gate coupled to said means, means coupled to said gate for making a time summation of said first quantity during the time said gate is open, means for obtaining a second electrical quantity, means for obtaining a third electrical quantity, means for making a time summation of said second electrical quantity, means for comparing said summed second electrical quantity with said third electrical quantity arranged to close said gate when said compared quantities are equal.

11. An arithmetic computer as set forth in claim 10 wherein means are provided to open said gate at the same time the summation of said second electrical quantity is begun.

12. An arithmetic computer as set forth in claim 10 for deriving a quantity proportional to the ratio of $B/(B+C)$, B and C denoting magnitudes, wherein said first electrical quantity is a reference quantity and said third quantity is an input electrical quantity having a magnitude B, wherein said means for obtaining a second quantity comprises an adder in which said input quantity B and a second input quantity C are added to obtain said second electrical quantity, and means to open said gate at the same time that summation of said second electrical quantity is begun.

13. An arithmetic computer as set forth in claim 10 for deriving a quantity proportional to a selected root of the quantity A wherein said first electrical quantity is a reference voltage magnitude, and said third electrical quantity is a voltage magnitude A and said means for obtaining a second electrical quantity comprises a signal path coupled from the output of said first time summation means.

14. The arrangement set forth in claim 10 wherein said gate and comparator are provided by an active semiconductor device to whose input electrodes said first electrical quantity and said second summed electrical quantity are applied to cause the conductivity of said semiconductor device to revert from one condition to another upon the occurrence of near equality between said input quantities, and whose output electrode is coupled in circuit with said means for obtaining a first electrical quantity and said first time summing means for gating the transfer of said electrical quantity in accordance with the conductivity of said semiconductor device.

15. The arrangement set forth in claim 10 wherein said first electrical quantity is a frequency and said first and second time summing means are counters, said second electrical quantity being a frequency and said third electrical quantity comprising a number of pulses.

16. The arrangement set forth in claim 10 wherein said first, second and third electrical quantities are frequencies and said time summing means are counters, and wherein additional gating means are provided for controlling the time duration that the second and third input quantities are supplied.

References Cited in the file of this patent

UNITED STATES PATENTS 2,605,962 Berger ---------------- Aug. 5, 1952

OTHER REFERENCES

Time-Sharing Analog Multiplier (TSAM), Transactions of the Professional Group on Electronic Computers, March 1954, pages 11 to 17, FIGS. 1, 4 relied upon.